A. F. Jaloureau,
Making Water Pipes.
No 1,406. Reissued Feb. 10, 1863.
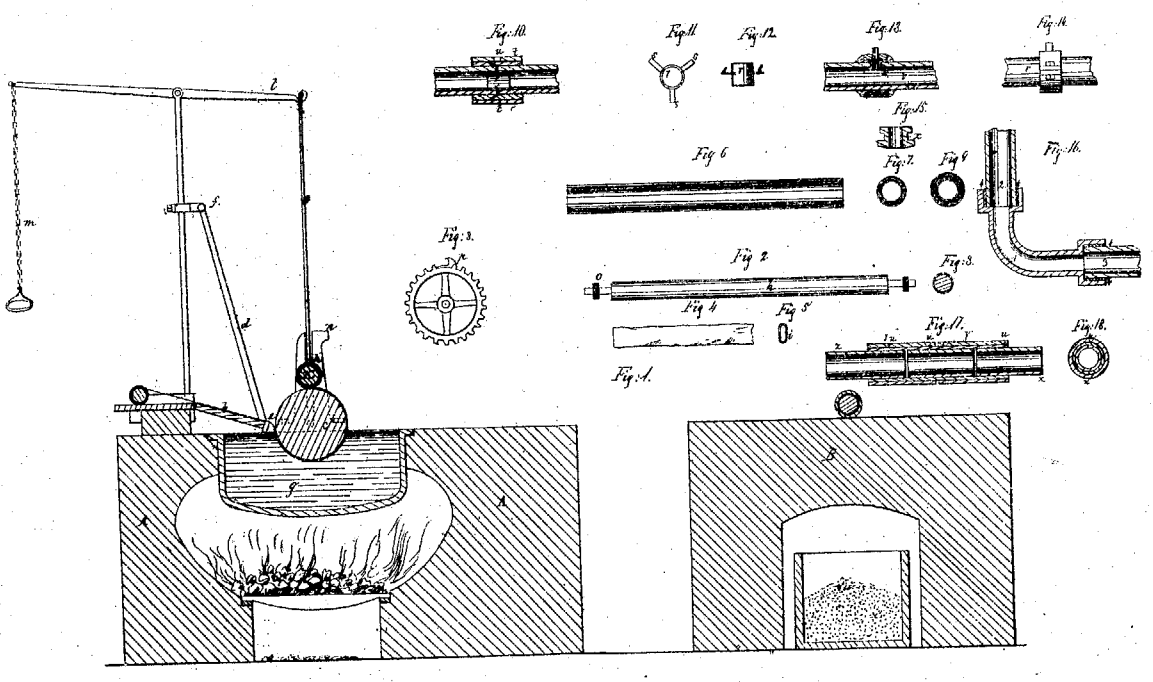
Witnesses.
Inventor:
Alex F. Jaloureau
by A. H. Buckley

UNITED STATES PATENT OFFICE.

THURLOW WEED AND PHILO S. SHELTON, OF ALBANY, NEW YORK, ASSIGNEES OF ALFRED FAUVIN JALOUREAU, OF FRANCE.

IMPROVED PROCESS OF MANUFACTURING WATER PROOF CEMENT PIPES.

Specification forming part of Letters Patent No. 24,125, dated May 24, 1859; antedated December 30, 1857; Reissue No. 1,406, dated February 10, 1863.

*To all whom it may concern:*

Be it known that ALFRED FAUVIN JALOUREAU, of Paris, in the Empire of France, has invented a new and useful Improvement in the Process of Manufacturing Pipes or Tubes Impervious to Water or Air, of which the following is a full, clear, and exact description, reference being had to the accompanying drawings, making part of this specification, in which—

Figure 1 is a vertical section of an apparatus which may be used in working the said process. The other figures will be referred to and explained hereinafter.

The said invention of the said ALFRED FAUVIN JALOUREAU relates to a process for manufacturing pipes or tubes for conveying or holding liquids or gases, and for other purposes, from sheets or rolls of paper, or other tissue.

And the said invention consists in rolling the paper or other sheet, to obtain the required thickness of tube or pipe, onto a rotating mandrel as it (the paper or other tissue) is drawn through liquid, bituminous, or other equivalent mastic, so that the several thicknesses or windings of paper or other tissue shall be united by the interposed mastic, which, in a liquid state, penetrates into the pores of the paper or other tissue and unites therewith, and after drying renders the tube or pipe, so produced, impervious to liquid or gaseous fluids, while the union of the fibrous material and the mastic impart the hardness, toughness, and strength required for many of the purposes for which metal pipes have heretofore and are now generally used.

And the said invention of a process also consists in using a tubular sleeve of paper slipped onto the mandrel, which is previously oiled or otherwise lubricated to prevent adhesion, and winding the sheets of paper, or other tissue, and mastic onto such paper sleeve, as a means of readily withdrawing the mandrel after the pipe or tube has been formed.

It is best to have the paper or other tissue from which a pipe or tube is to be made wound on a roller, *a*, placed in front of an inclined table, *b*, leading to a kettle, *g*, containing the mastic, which is to be kept in a fluid or semi-fluid state by fire in a suitable furnace below. Bituminous or equivalent mastic or cement may be used, but bituminous mastic, made in the usual manner of asphalt or coal-tar, in admixture with earthy substances, is preferred. At the sides of the kettle there are two standards, *n*, (one only shown in the drawings,) which are slotted to receive the journals of a cylinder, *c*, so that the lower part of its periphery, when it is rotated by a crank-handle on its shaft, or by other suitable means, shall run in the liquid mastic. The end of the sheet of paper or other tissue is drawn from the roller *a* along over the inclined table *b*, and applied to the periphery of the cylinder *c*, to which it will stick by reason of the surface being coated with the mastic, and as the cylinder is rotated the paper or other tissue is thereby carried into and out of the liquid mastic, and the outer surface thereof thoroughly coated. The mandrel *k*, on which the tube or pipe is to be formed, is best made of metal. Its journals are fitted to the slots in the standard *n*, and are free to turn and slide up and down so that its periphery shall bear on that of the cylinder *c*.

To prevent the tube or pipe which is to be formed from adhering to the surface of this mandrel *k* it should be covered with a sleeve made of paper, in the form of a tube, (see Figs. 3, 4, and 5,) and made to fit it snugly. To facilitate the putting on of this sleeve a cone may be used in the same manner as cylindrical wicks are slipped onto the wick-holders of lamps. And to prevent this sleeve from becoming cemented to the surface of the mandrel by dripping mastic, care should be taken to grease or oil the surface of the mandrel before putting on the sleeve.

So soon as the end of the sheet of paper or other tissue by the rotation of the cylinder reaches the mandrel it must be detached from the surface of the cylinder by any suitable instrument and pressed to the surface of the sleeve on the mandrel, to which it will readily adhere by reason of the coating of mastic on its outer surface. The operation being thus started, by continuing to turn the cylinder *c* and the mandrel in opposite directions, but so that the peripheries in contact will move with equal velocities, the sheet of paper or other tissue will be drawn from the roller *a*, carried through and coated with mastic in the kettle, and thus coated will be rolled up on the mandrel, and the successive windings, with interposed mastic, pressed, and the surplus mastic pressed out by the weight of the mandrel resting on the periphery of the cylinder. As soon as the required thickness is obtained, the mandrel is lifted off, which may be done by pulling a chain, *m*, on one end of a lever, *l*, the other end of which is provided with rods *h*, having hooks at their lower ends, which take hold of the journals. The mandrel is then transferred to a smooth table, B, made of stone, brick, or other suitable material, and covered with fine sand, and by two men taking hold of the end journals it is rolled back and forth over the table until a sufficient quantity of sand becomes embedded into the outer coating of mastic, and the surface is rendered smooth and cylindrical. It is then again transferred to the cylinder *c* to receive from the periphery thereof another coating of mastic; but, as it is desirable that this last coating of mastic should be of equal thickness, a cog-wheel, *p*, (represented separately in Fig. 8,) is mounted on the shaft of the cylinder *c*, and its cogs are engaged by the cogs of a pinion, *o*, (see Fig. 2,) on the shaft of the mandrel, and the cylinder is thereby turned. The wheel *p* has a segment without cogs, so that the length of the cogged sector determines the number of revolutions to be given to the cylinder. As soon as the cogless sector of the wheel *p* reaches the pinion *o* the outer coating is completed, and the cylinder will stop. The mandrel, with the tube or pipe thereon, is again lifted from the cylinder *c* and transferred to the table B, and there rolled a second time, to force sand into this last coating of mastic.

After the above operation, the mastic coating is permitted to cool, which may be accelerated by a shower of cold water, and after the formed tube or pipe is cooled, the mandrel can be taken out by simply standing it on end and giving it a few knocks. Until the several coatings of mastic become thoroughly dry the tube or pipe thus formed is liable to get out of shape, and to prevent this, when the iron mandrel is taken out all that is necessary is to insert a wooden mandrel.

After the mastic has become dry and indurated the paper sleeve may be removed by means of a metallic brush or other suitable instrument, and afterward the inside of the pipe may be coated with bituminous mastic, or other water-proof mastic or cement, by standing it up on end with the lower end closed and pouring in the liquid mastic or cement, and then turning it over and pouring out the surplus mastic, leaving the whole inner surface thoroughly covered with a coating impermeable to air or water.

Instead of the inner coating of mastic a thin tube made of glass or earthenware may be put upon the mandrel and by the process above described covered with paper or other tissue, wound upon it with mastic by the process above described.

A method of connecting such tubes together is represented in Figs. 10, 11, and 12. Into the ends of two tubes to be united together is fitted a short pipe, *r*, made of zinc or other suitable metal, and which is provided with a number of arms, *s*, which are bent as shown in Fig. 10. The whole is then covered with a sleeve, *t*, made in the manner above described, and finally bituminous mastic in the liquid state is poured in through a hole at *u* and fills the whole space between the tubes and the sleeve *t*, so that when the mastic sets it constitutes a strong, durable, and impermeable connection.

For laying down and connecting main pipes of a great diameter another plan may be adopted, as shown in Figs. 17 and 18. It consists in arranging two sets of tubes, one set within the other, and breaking joints, as represented, so that the joints of the inner tubes, *x*, shall be covered over by the outer tubes, *y*. Sufficient space is left between the inner and the outer tubes to receive liquid bituminous mastic, which is poured through holes *u* in the outer tubes, *y*, to fill the whole space *z* between the two sets of tubes, so that when the mastic solidifies it forms the bond to unite the two sets of tubes.

The tapping may be effected in the manner represented in Figs. 13, 14, 15 of the drawings. After boring a hole of suitable size in the main tube, a short pipe, *x'*, Fig. 15, made of vulcanized india-rubber, is formed with flanges at both ends and inserted into the said hole, which can be done by reason of the compressible nature of that substance, and after it is inserted by its elastic property it will expand and clasp the thickness of the pipe *v*. A suitable collar is then placed over the tube and a faucet screwed tightly into it and into the india-rubber pipe *x'*.

In forming knee-jointed connections, as represented in Fig. 16, the ends of the two tubes 2 and 3 are inserted into the enlarged ends of a knee-jointed pipe, 1, and the spaces 4 filled with a bituminous mastic. The edges of the tubes may be also embedded into concentric grooves formed for that purpose in the ends of the elbow-pipe.

What is claimed as the invention of the said ALFRED FAUVIN JALOUREAU, and desired to be secured by Letters Patent, is—

1. The process of forming pipes or tubes of rolls of paper or other tissue and bituminous mastic, by drawing or passing the paper or other tissue through the liquid mastic and rolling it up to the required thickness on a mandrel, to cause the several windings and the interposed mastic to unite, substantially as described.

2. The forming of such pipes or tubes on a paper sleeve or cylindrical tube fitted to the outer surface of the mandrel, substantially as described, by means of which the pipes or tubes when made can be readily slipped off from the mandrel, as set forth.

THURLOW WEED.
PHILO S. SHELTON.

Witnesses as to Thurlow Weed:
B. W. GRISWOLD,
SAML. BLATCHFORD.

Witnesses as to Philo S. Shelton:
JOHN AYRES,
C. E. BUFFUM.